Oct. 24, 1967  H. N. LOVE  3,348,728
PRESSURE VESSELS
Filed Jan. 4, 1965
FIG. 1
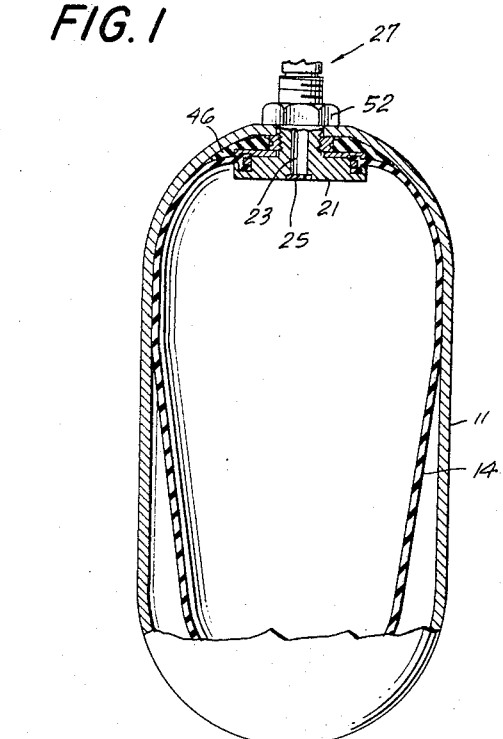
FIG. 2
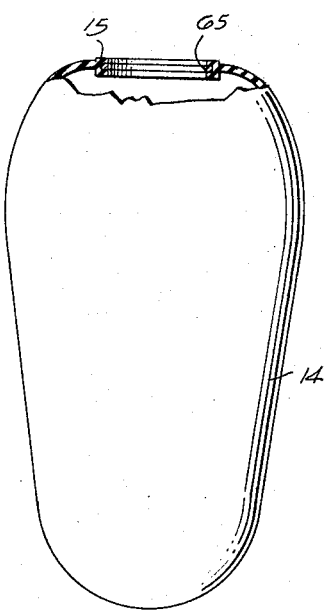
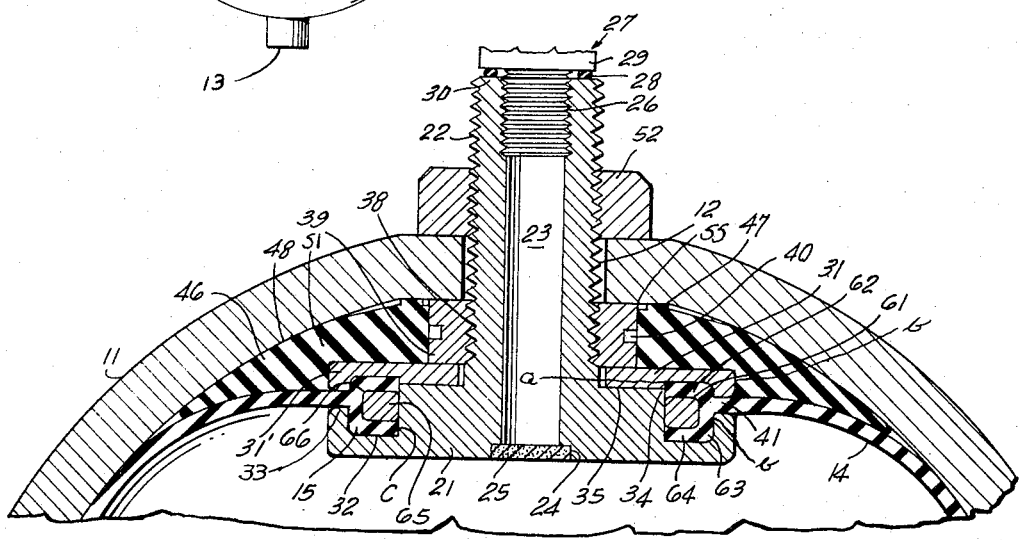
FIG. 3
INVENTOR
HAROLD NORRIS LOVE
BY
Dean Fairbanks & Hirsch
ATTORNEYS United States Patent Office 3,348,728
Patented Oct. 24, 1967

3,348,728
PRESSURE VESSELS
Harold Norris Love, Chicago, Ill., assignor, by mesne assignments, to W. R. Grace & Co., Cambridge, Mass., a corporation of Connecticut
Filed Jan. 4, 1965, Ser. No. 422,954
9 Claims. (Cl. 220—63)

ABSTRACT OF THE DISCLOSURE

The invention relates to the art of pressure vessels, more particularly of the type having a rigid shell or container having a bladder mounted therein and separating two fluids stored under pressure in the container. The rim of the bladder has an enlarged annular bead with an annular groove on the inner surface thereof in which a rigid annular member is positioned to permit dependable clamping of the mouth of the bladder in position.

---

This invention relates to the art of pressure vessels, more particularly of the type having a rigid shell or container having a bladder mounted therein and separating two fluids stored under pressure in the container.

As conducive to an understanding of the invention, it is noted that when the mouth of the bladder has a thickened bead to permit clamping of the bladder mouth in fixed position in the container, if the thickness of the bead is not sufficient, it may not be able to be dependably clamped in place with resultant leakage and malfunctioning of the pressure vessel.

When the bead is made of sufficient thickness and the mouth of the baldder is of relatively small diameter with respect to the maximum diameter of the bladder, since bladders are generally formed on a rigid core positioned in a mold, and removed from the core by applying gas under pressure between the core and the bladder, due to the thickened bead at the small diameter mouth of the bladder, the bladder may not be able to be removed from the core by reason of its large diameter with respect to the bladder mouth without rupture. Even if the bladder can be removed, excessive stretching is imparted to the thickened bead, that will prevent it returning to its original diameter. As a result, the bead will not seat properly in the clamping grooves in the fitting by means of which the bladder is secured in the container with resultant cutting of the bead when the fitting is tightened and malfunctioning of the pressure vessel.

It is accordingly among the objects of the invention to provide a pressure vessel of the bladder type in which the mouth of the bladder is of relatively small diameter with respect to the maximum diameter of the bladder, and may have an annular bead of thickness such as to permit dependable clamping of the bladder in place, yet without such stretching of the bead when removed from the core on which it is formed, that will prevent automatic restoration of the bead of the bladder to its original desired diameter after removal from such core.

Another object is to provide a bladder for use in pressure vessels, which bladder has a mouth that is of relatively small diameter with respect to the maximum diameter of the bladder and has a thickened bead at such mouth to provide dependable retention of the bladder in the pressure vessel, yet which may readily be formed by conventional molding techniques and removed by the core on which it is formed by a conventional blowing operation with assurance that the thickened bead of the bladder will automatically restore to its original diameter even after passing over the large diameter portion of the core.

Still another object is to provide a bladder of the above type which may dependably be retained in place in a pressure vessel by clamping means which are relatively simple in construction and which may readily be fabricated at low cost and which may readily be assembled securely to clamp the bead at the mouth of said bladder in fixed position without likelihood of injury thereto so that when said clamping means is affixed to the gas inlet port of a pressure vessel, a dependable seal will be provided to prevent leakage between the gas and liquid chambers of the pressure vessel defined by the bladder and also to prevent leakage from the interior of the pressure vessel and which clamping means may readily be disassembled for removal of a defective bladder.

According to the invention, these objects are accomplished by the arrangement and combination of elements hereinafter described and particularly recited in the claims.

In the accompanying drawings in which is shown one of various possible embodiments of the several features of the invention, FIG. 1 is a longitudinal sectional view partly in cross cross section of a pressure vessel according to the invention, FIG. 2 is a side elevational view partly in cross section of a bladder according to the invention, and FIG. 3 is a fragmentary sectional view on an enlarged scale showing the mouth of the bladder and the clamping means therefor.

Referring now to the drawings, the pressure vessel shown in FIG. 1 comprises a shell or container 11 preferably cylindrical as shown and having axially aligned ports 12 and 13 at each end. Positioned in the container 11 is a bladder 14 of resilient material such as rubber, which may be natural or synthetic and illustratively substantially conical in contour having a mouth at one end with a thickened annular bead 15.

The bladder is retained in the container by the clamping means illustratively shown.

As is clearly shown in FIGS. 1 and 3, such clamping means comprises a circular plate or disc 21 which has a stem 22 rising therefrom and preferably formed integral therewith. Extending through the stem and the disc is an axial bore 23, which is of enlarged diameter at its inner end defining a cavity 24 in the undersurface of the disc 21, which is filled with a mass or plug of porous material 25, such as a sintered metal such as bronze, for example.

The outer end of bore 23 is desirably internally threaded as at 26 to receive the correspondingly threaded end of an air valve 27, which may be a conventional "Schrader" valve. Desirably, a resilient seal ring 28, such as an O ring, encompasses the end of the valve 27 and is compressed between the flange 29 of the valve and the end 30 of the stem to prevent leakage of air.

Positioned in juxtaposition to the disc 21 is a circular clamp plate 31 desirably having a depending peripheral rim 31' and having a central opening through which the stem 22 extends to. center the plate with respect to the disc 21. The disc 21 and the clamp plate 31 are conformed so that when they are in juxtaposition, their opposed surfaces will engage near their inner peripheries and they will define an annular cavity C near their outer peripheries, said outer peripheries being spaced to define an annular opening leading into the annular cavity.

To this end, the disc 21 is desirably provided with an annular groove 32 in its upper surface adjacent its periphery 33. The portion of the upper surface of disc 21 between the inner edge 34 of groove 32 and the root end of stem 22 defines a clamping surface 35 which, as shown in FIG. 2, lies in a plane above that of the periphery 33 of the disc.

Adapted to be positioned in groove 32 is the thickened bead 15 at the mouth of the bladder 14 of the pressure vessel and the mouth of the bladder is of such diameter that when the disc 21 is positioned therein, as shown in FIGS. 1 and 3, the bead 15 will be aligned with groove 32.

Means are provided releasably to retain the plate 31 against the disc 21 so that the bead 15 will be compressed therebetween substantially filling the annular cavity C defined by the groove 32 and the opposed surface of plate 31.

To this end as shown in FIG. 3, the stem 22 adjacent its root end is externally threaded as at 38 and adapted to receive a cylindrical nut 39, for example, which has suitable recesses 40 so that it may be rotated by a spanner wrench for example to urge the clamp 31 downwardly against the clamping surface 35 of the disc 21.

As a result, the bead 15 of the bladder 14 will be compressed in the annular cavity C defined by groove 32 and clamp plate 31. However, by reason of the spacing between the outer peripheries 31', 33 of the clamp plate 31 and the disc 21, the portion 41 of the bladder wall extending laterally outward from the bead 15 will be substantially uncompressed.

Encompassing the nut 39 is a spacer member 46, desirably a disc of resilient material such as natural or synthetic rubber, which preferably is of the same type as the bladder. The spacer member 46 desirably has an outstanding annular bead 47 adjacent its inner periphery which rises above the top of the nut 39. The upper surface of the spacer member is conformed so that it has a curvature substantially complementary to the curvature of the inner surface 48 of the shell. The periphery 51 of the spacer member is so conformed that when the stem 22 of the clamping means is inserted through the port 12 of the shell and the top of the nut 39 is drawn against the shell, as shown in FIG. 3, by means of a nut 52 screwed on the threaded end of the stem protruding beyond the shell, such periphery 51 of the spacer member 46 will be compressed between the shell and the clamp plate 31 and will extend beyond the periphery 31' of the plate 31.

The bladder 14 is molded on a core positioned in a mold cavity in conventional manner. After the bladder is formed and the mold is opened, the bladder is removed from the core by applying gas under pressure between the core and the bladder wall which will cause the bladder to stretch and strip off the core. As such molding and removal techniques are conventional, they will not be further described.

The mouth of the bladder 14 is of considerably smaller diameter than the maximum diameter of the bladder and illustratively has an internal diameter of 2⅞" as compared to the maximum internal diameter of the bladder of 7⅞". As a result, when the bladder is blown off the core, the mouth of the bladder must stretch sufficiently to pass over the large diameter portion of the core which also has a diameter of approximately 7⅞".

As a result of such extreme stretching of the bladder mouth, if the thickness of the bead 15 is relatively great, it has been found that due to the relatively large volume of rubber contained in the bead, it is stretched to a degree that exceeds the capability of the rubber to return to its original molded form. As a result, the bead will not seat properly in the groove 32 defined in disc 21 and hence when the plate 31 is clamped against the disc 21, if the bead 15 is not properly seated there will be resultant failure of the fluid tight seal and possible cutting of bead 15 with resultant destruction thereof and need for replacement of the bladder.

Where the thickness of the bead 15 is made sufficiently small to permit stretching of such bead over the large diameter portion of the core, yet return of such bead to its original molded form, when such relatively thin bead is positioned in the groove 32 in disc 21, there would be insufficient thickness of bead material to prevent pull out of the bead from the groove 32, when the bladder was repeatedly expanded in use.

To solve such problems, according to the present invention, the bead 15 of the bladder is molded with an internal annular groove 61 in its inner periphery.

Since the thickness of each of the top, side and bottom walls 62, 63, 64 of the bead which define the groove 61 is relatively small, the grooved bead 15 will readily stretch over the large diameter portion of the core and then return to its original molded size.

Positioned in the groove 61 is a rigid annular member 65 which may be cut from a steel cylinder for example, the edges of the annular member being rounded as at 66 to prevent cutting of the walls of the bead 15.

With the annular member 65 positioned in the groove 61 of bead 15, the latter may then be positioned in the annular groove 32 in disc 21.

As a result, the bead is maintained at the desired thickness to insure dependable clamping thereof by the disc 21 and plate 31 between which the bead 15 is positioned.

Due to the squeezing of the walls of the bead around the rigid ring 65 which is of desired dimensions so that it will be aligned with the annular groove 32, small out of tolerance variations in the bead which may develop during the process of stripping the bladder off the core are compensated.

When the assembled accumulator is charged with gas and liquid under pressure, as the bead 15 is compressed in annular cavity C and at the joint 34 is subjected to atmospheric pressure on its side $a$ and to the high pressure of the air in bladder 14 and the liquid in the shell 11 (which are equal) on its side $b$, the resultant differential in pressure will cause the bead 15 to wedge in joint 34 acting in the manner of a conventional O ring to provide a dependable seal at such joint.

As the bead 47 is compressed adjacent the joint 55 defined between the shell and the retaining nut 39, and one side of said head subjected to atmospheric pressure and the other to the high pressure of the liquid in the shell, which will pass between the shell and the compressed periphery of the spacer member 46, due to the differential between the pressure on opposed sides of the bead 47, it will be forced into the joint 55 to provide a dependable seal.

When the bladder 14 expands in conventional manner to force liquid from the container, as the portion thereof adjacent the periphery of plate 31 moves against the shell wall, it will abut against the resilient spacer member 46, which will prevent extrusion of the bladder between the plate 31 and the shell. When the bladder is compressed upon initial charging of the container with liquid, in the event it is forced against the end of the air inlet bore 23, by reason of the porous plug 25, it will not be extruded.

With the construction above described, a bladder is provided having a mouth that is of relatively small diameter with respect to the maximum diameter of the bladder, yet having an annular bead at its mouth of sufficient thickness for dependable clamping thereof in fixed position in a pressure vessel, yet which may be removed from the core on which it is formed with assurance that the mouth of the bladder will return to its original molded dimension.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A bladder for a pressure vessel, said bladder being of resilient deformable material and being circular in cross section and having a port at one end axially aligned with the longitudinal axis of the bladder, said port having a thickened annular bead of diameter smaller than the maximum cross section diameter of said bladder, said bead having a rigid member removably positioned therein.

2. A bladder for a pressure vessel, said bladder being of resilient deformable material and of greater length than width and being circular in cross section, said bladder having a port at one end axially aligned with the longitudinal axis thereof, said port having a bead around the peripherly thereof of thickness greater than the wall thickness of the adjacent portion of the bladder, said port being of diameter approximately one-third that of the maximum diameter of said bladder, and a rigid member removably positioned in said bead.

3. A bladder for a pressure vessel, said bladder being of resilient deformable material and having a port having a thickened annular bead, said bead having an annular groove therein extending from the inner side of the bead to the outer side thereof and a rigid annular member removably positioned in said annular groove.

4. The bladder recited in claim 3 in which said groove defines a top wall, a side wall and a bottom wall, the thickness of said walls being substantially the same as that of the portion of the bladder wall adjacent the side wall of said bead.

5. A bladder for a pressure vessel, said bladder being of resilient deformable material and being circular in cross section and having a port at one end axially aligned with the longitudinal axis of said bladder, said port having a thickened annular bead of diameter smaller than the maximum cross section of said bladder, said bead having an annular groove therein extending from the inner side of the bead to the outer side thereof, a rigid annular member positioned in said annular groove, a disc positioned in said bladder and having a stem rising axially therefrom extending through said port, a clamp plate having a central opening through which said stem extends, means to retain said clamp plate adjacent its inner periphery against the opposed surface of said disc, the opposed surfaces of said disc and said clamp plate near their outer peripheries being confined to define an annular cavity therebetween, the outer peripheries of said disc and said clamp plate being spaced to define an annular opening leading into said cavity, said annular bead being positioned in said cavity, said rigid annular member being of thickness less than the height of said annular cavity and said bead with said rigid annular member being of thickness less than the height of said an said annular cavity, whereby when said clamp plate is retained against said disc, the bead will be compressed to fill said annular cavity and the portion of the bladder wall extending outwardly from the bead will be substantially uncompressed.

6. The combination set forth in claim 5 in which the portion of the stem rising from the disc is externally threaded on the retaining means comprising a nut screwed on said threaded portion.

7. The combination set forth in claim 5 in which the retaining means encompasses the stem of the disc adjacent its root end and a spacer disc of resilient material encompassing said retaining means and is in engagement with the surface of the clamp plate remote from the disc, said spacer member having a portion extending beyond the surface of the retaining means remote from the clamp plate when not compressed.

8. The combination set forth in claim 7 in which the retaining means is a cylindrical nut and the root end of the stem is externally threaded to receive said nut.

9. A pressure vessel comprising a rigid container having a port, a bladder in said container of resilient deformable material, said bladder being substantially circular in cross section and having a port at one end axially aligned with the longitudinal axis of said bladder, said port having a thickened annular bead of diameter smaller than the maximum cross section of said bladder, said bead having an anular groove therein extending from the inner side of the bead to the outer side thereof, a rigid annular member positioned in said annular groove, a disc positioned in said bladder and having a stem rising axially therefrom extending through said bladder port and container port, a clamp plate having a central opening through which said stem extends, means to retain said clamp plate adjacent its inner periphery against the opposed surface of said disc, the opposed surfaces of said disc and said clamp plate near their outer peripheries being confined to define an annular cavity therebetween, the outer peripheries of said disc and said clamp plate being spaced to define an annular opening leading into said cavity, said annular bead being positioned in said cavity, said rigid annular member being of thickness less than the height of said annular cavity, and said bead with said rigid annular member therein being of thickness greater than the height of said annular cavity, whereby when clamp plate is retained against said disc, the bead will be compressed to fill said annular cavity and the portion of the bladder wall extending outwardly from the bead will be substantially uncompressed.

References Cited
UNITED STATES PATENTS

| | | | |
|---|---|---|---|
| 2,792,022 | 5/1957 | Mercier | 138—30 |
| 3,113,592 | 12/1963 | Mercier | 138—30 |

THERON E. CONDON, *Primary Examiner.*

JAMES B. MARBERT, *Assistant Examiner.*